United States Patent [19]

McPherson

[11] Patent Number: 4,674,605
[45] Date of Patent: Jun. 23, 1987

[54] AUTOMATIC ELEVATOR LOAD SENSOR CALIBRATION SYSTEM

[75] Inventor: Donald G. McPherson, Westminster, Colo.

[73] Assignee: Otis Elevator Company, Farmington, Conn.

[21] Appl. No.: 853,600

[22] Filed: Apr. 18, 1986

[51] Int. Cl.<sup>4</sup> ............................................. G01G 19/14
[52] U.S. Cl. .................................................. 187/131
[58] Field of Search ...................... 73/1 R; 187/29 R; 212/158; 340/19, 20, 21; 414/21

Primary Examiner—William M. Shoop, Jr.
Assistant Examiner—Richard K. Blum

[57] ABSTRACT

An empty elevator car is caused to lift a predetermined calibration weight(s) located above the normal car excursion. The car load sensor signals before and after lifting the calibration weight together with the known values for the empty car weight and the calibration weight are used to recalibrate the load versus signal function.

7 Claims, 3 Drawing Figures

4,674,605

AUTOMATIC ELEVATOR LOAD SENSOR CALIBRATION SYSTEM

DESCRIPTION

BACKGROUND OF THE INVENTION

Many modern elevators are equipped with sensors that provide load signals to the elevator controller indicative of the elevator car weight. The measured weight of the elevator car can be used by the controller to precisely pretorque the motor prior to releasing the brake, to implement special dispatching strategies such as bypassing hall calls when the car is full, or indicating an overload condition. For bypassing hall calls or indicating an overload condition, the load signal is compared with a predetermined load value stored in the elevator controller.

All sensor systems are subject to drift over long periods of time, resulting in the need for calibration. In the context of elevator car load weighing, sensor drift can result in jerky starts when the motor is incorrectly pretorqued. This can also result in the improper implementation of the special dispatching strategies such as hall call bypass when the car is not fully loaded or vice versa; for instance, when the load signal is larger than it ought to be, or in the failure to implement hall call bypass when the load signal is smaller than it ought to be.

The usual method of calibrating the load sensors is for service personnel to bring calibration weights to the building, and measure the sensor signals under different load conditions.

DISCLOSURE OF THE INVENTION

Therefore, it is an object of this invention to provide a technique for automatically recalibrating the load sensing system.

According to the invention, the load measurement system is calibrated by using the load sensor output signals for two or more known values of load to modify the coefficients and/or exponents in the equation used to characterize the function of load versus load sensor signal. One known value of load is that of the empty car; other known values of load are obtained automatically as a result of the elevator lifting weights of predetermined value by traveling slightly beyond the normal car excursion at the top of the hoistway.

Other objects, features and advantages of the invention will become apparent in light of the following description thereof.

BEST MODE FOR CARRYING OUT THE INVENTION

Figure 1:
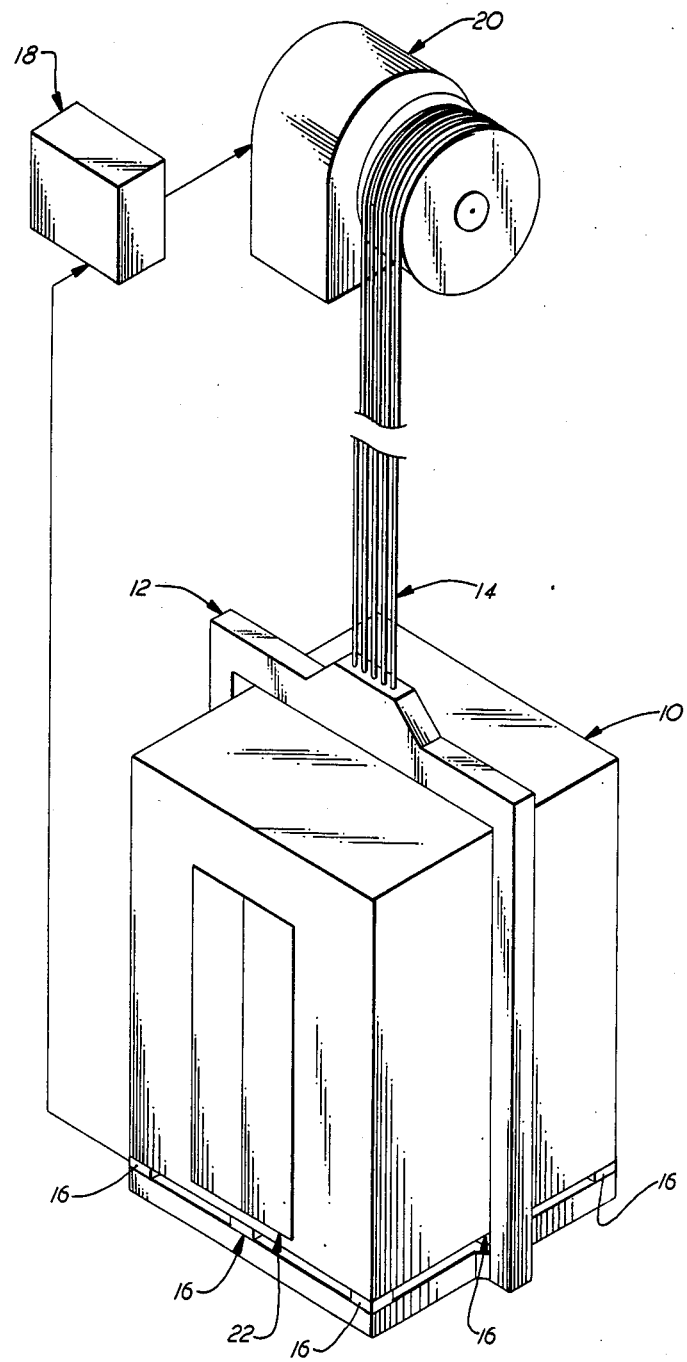
FIG. 1 is a schematic of a prior art elevator system including load weighing capability.

FIG. 1 shows an elevator car 10 supported in a car frame 12 by cables 14. Load sensors 16, such as strain gauges, provide load signals indicative of car weight to an elevator controller 18 that directs the automatic operation of the elevator car, such as by controlling the lift motor 20 and the car doors 22.

Figure 2:
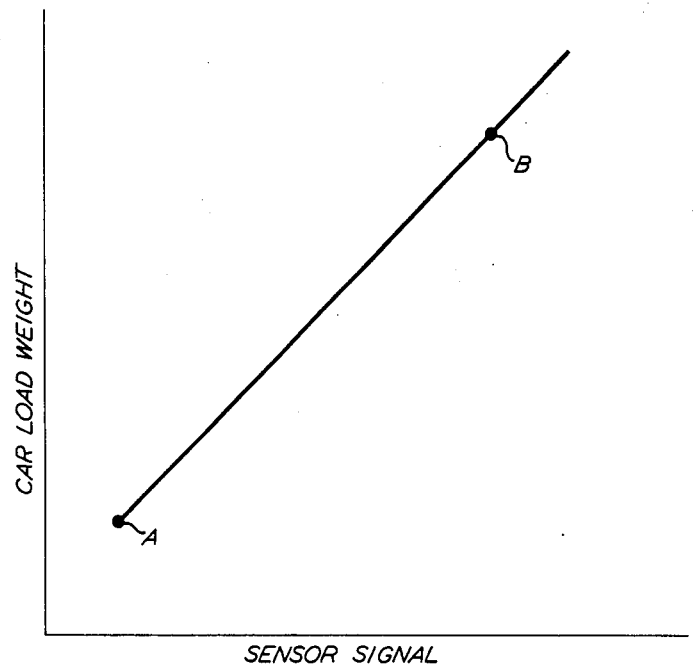
FIG. 2 is a typical load versus sensor signal function for a linear sensor system.

Typically the load is determined as a result of the controller 18 performing a mathematical operation on the load signal in accordance with the equation used to characterize the relationship between signal and load. This is illustrated in FIG. 2 for a linear load versus signal relationship. The Point A represents the signal for the empty car load, and the Point B represents the signal for some other load, such as the full car load. These two points are necessary and sufficient for defining the entire linear characteristic of load versus signal for the entire load range. The method may be applied to nonlinear characteristics of load versus signal such as polynomial or logarithmic curve fits; however, depending on the required accuracy, one or more additional known loads may need to be applied.

In this invention the sensor signal with the car empty provides Point A for determination of the above described characteristic function. To assure that the car is empty, automatic calibration will be performed only after the car has been parked a considerable time with the doors closed and with no indication of car occupancy, such as in-car attempts to open doors or to communicate from the car, and only if the initial load indication is within a given tolerance of zero net load.

Further, in this invention the sensor signal for Point B for determination of the above described characteristic function is provided by the car lifting a calibration weight or set of calibration weights of known quantity which are suspended in the hoistway. The additional weight on the car results in a changed sensor signal, which provides another data point, that is Point B.

Figure 3:
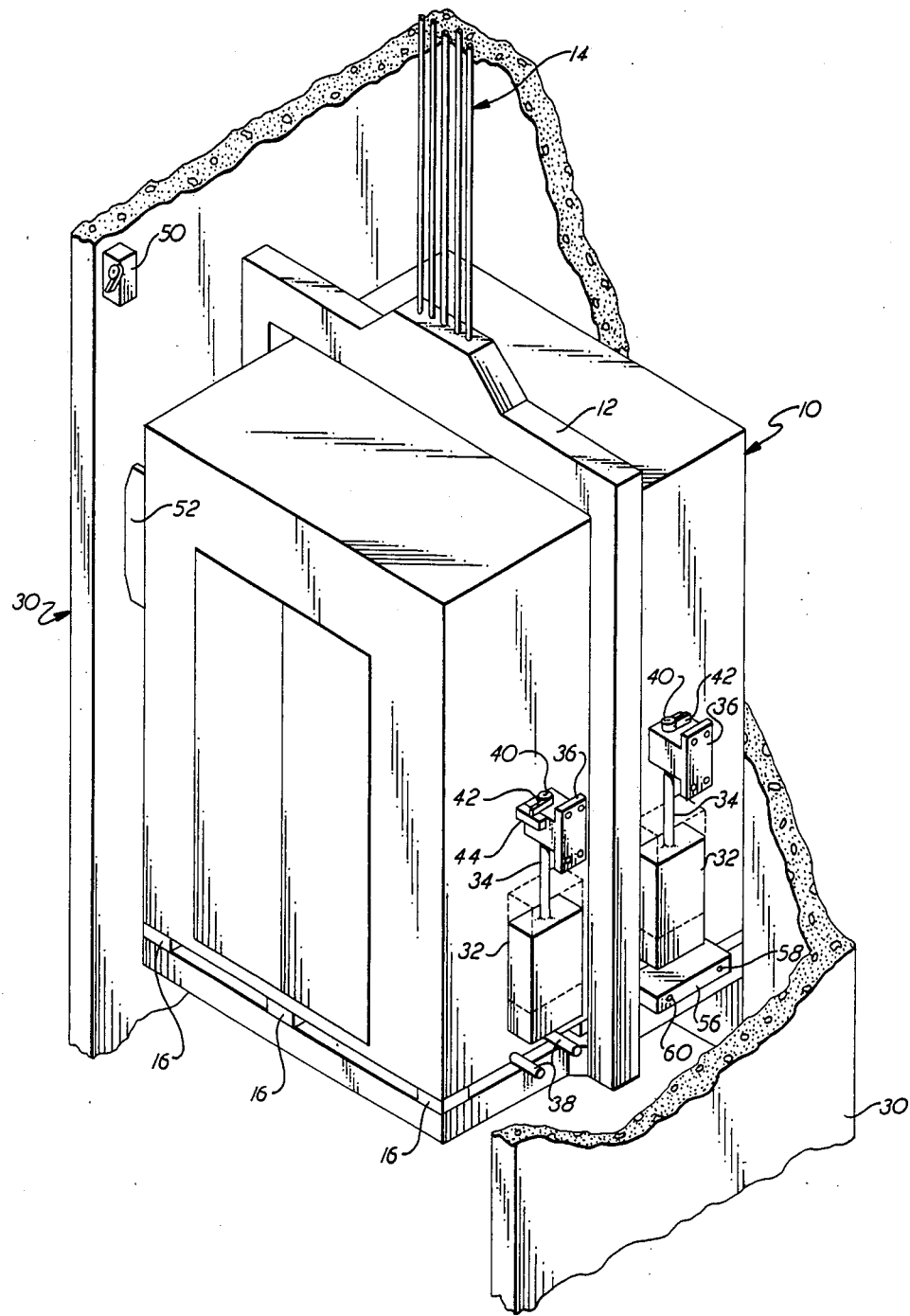
FIG. 3 is an isometric view of the automatic elevator load sensor calibration system of this invention.

FIG. 3 shows the elevator car 10 positioned at the uppermost landing in the hoistway 30. Four calibration weights 32 are suspended adjacent the car by rods 34 from brackets 36 which are attached to the shaftway 30. (Only the two weights 32 on the visible side of the car are shown. Two other weights are similarly disposed on the opposite side of the car which is not visible in the drawing.) The rods 34 are disposed vertically in the hoistway 30, are fixed at their lower ends to the weights 32, and pass through vertical holes in the brackets 36 so that the weights 32 are free to be lifted by the car in the following manner. End constraints 40, such as locknuts on the upper ends of the rods 34, retain the weights in the position shown, until they are lifted by the car. Two methods of lifting the weights are disclosed.

In the first method, rods 38 protrude horizontally sideways from the base of the car, in vertical alignment with the weights 32. This arrangement would be typical for all four weights. As the car 10 is moved upward beyond the position shown, the rods 38 engage and lift the weight 32 without interfering with the car frame 13 or other appurtenances in the shaftway. The dotted lines show the calibration weights 32 in the lifted position, thus bringing the weight of the calibration weights to bear on the car, and hence on the sensors 16. A tab 42 on the upper end of the rod 34 disengages a normally closed microswitch 44 or similar device when the calibration weights are raised to provide an indication that the weights are being supported by the car. The car is stopped and sensor readings are taken for a loaded condition. Thus, the force of the weights 32 together with the weight of the empty car 10 is brought to bear on the sensors. This provides another load condition for establishing Point B in FIG. 2, and the linear characteristic function can be computed by well-known mathematical methods for use in subsequent load weighing operations. One approach would be to calculate current load using the following equation:

$$L = K(S - S_O),$$

where
L = the current load,
S = the current sensor reading,
$S_O$ = the zero load or empty car sensor reading obtained during calibration, and
K = the scale factor (i.e., the slope of the characteristic function) computed during calibration.

The value of K is calculated from the following equation:

$$K = W/(S_L - S_O)$$

where,
W = the weight of the calibration weight, and
$S_L$ = the sensor reading for the car plus the calibration weight obtained during calibration.

For other than linear characteristic functions, coefficients and/or exponents may be determined using well-known curve fitting techniques. Since the general form of the characteristic function will usually be well established, two data points may be sufficient for this. Otherwise, the calibration weights 32 may be grouped into pairs at different elevations, and lifted successively to provide an incremental addition of weight for each additional data point (elevation).

To eliminate the error that would be introduced by inertial effects of the car mass, the car should be stationary when the sensor reading is taken. To facilitate this, limit switches may be used to indicate that the calibration weight 32 has been raised off of the end constraint of the rod 34.

Typically an upper terminal safety switch 50 engages a device 52 on the car 10 to prevent the car from overrunning the upper landing, but is usually disposed sufficiently above the car (at least outside of a door leveling zone), so that the limited car motion required to lift the weight is less than that required to trip the safety switch.

The engagement rods 38 are configured so that they may be retracted into the car floor, using electromechanical devices and linkages well known in the engineering arts. The engagement bars 38 are retracted during all normal elevator operations, and extended only during load sensor calibration. This would prevent any impediment to car travel in the event that the car overruns the safety switch. The engagement bars 38 may also be designed to shear in this contingency.

In the second method, an engagement platform 56 is hinged about a pivot 58. A force release mechanism or shear pin 60 holds the platform 56 in a horizontal position so that it will engage the calibration weight 32 as the elevator moves upward. This brings the weight of the calibration weights 32 to bear on the car 10 and hence on the sensors 16. The tab 42, microswitch 44 and sensor reading operation are the same as for the first method. If the platform strikes the calibration weight 32 at excessive speed or overruns the normal car excursion, the force release mechanism 60 activates (or the shear pin shears), allowing the platform 56 to swing into a vertical, out of the way position, to prevent damage to the equipment. This will only occur under abnormal circumstances, and would require the platform to be manually reset into the horizontal position.

The methods described have the advantage of loading the car floor directly thereby eliminating the necessity for structural strength in the car walls sufficient to support the calibration weight(s). Further advantages are that the top of the car is left clear for inspection operations and the calibration weights can be readily disengaged from contact with the car so that they are inoperative if the elevator overruns the top landing.

I claim:

1. A method of automatically calibrating an existing load weighing system in an elevator having a controller (18) receiving a load signal, S, from a load sensor (16), comprising:
   determining that the car is empty;
   storing the load signal, $S_O$, for the empty car in the controller;
   suspending calibration weights of predetermined weight, W, from the shaftway structure;
   providing a mechanism for the car to engage and lift the calibration weights;
   elevating the car sufficiently to cause the calibration weight to rest upon the mechanism, and then stopping the car;
   receiving the load signal, $S_L$, for the car after the weight is caused to rest upon the mechanism; and
   determining a scale factor, K, relating load signal to load, L, based on the load signal, $S_O$, for the empty car and the load signal, $S_L$, for the car with the weight resting upon the mechanism.

2. A method according to claim 1, wherein it is determined that the car is empty as a result of the car having been parked with its doors closed for a threshold time period.

3. A method according to claim 1:
   wherein the relationship of the load signal to load is linear;
   wherein $L = K(S - S_O)$; and
   wherein $K = W/(S_L - S_O)$.

4. A load weighing system for an elevator including a car and a shaftway, comprising:
   a sensor providing a load signal, S, indicative of car weight;
   weights of a predetermined weight, W, suspended in the shaftway;
   means for causing the weights to rest upon the car; and
   means for relating the load signal, S, to car load, L, based on the load signal, $S_L$, for the car with the weights resting upon it.

5. Apparatus according to claim 4, wherein:
   the means for causing the weights to rest upon the car includes means for the car lifting the weights when the car is at a position above the uppermost end of its normal excursion in the hoistway.

6. Apparatus according to claim 5, wherein:
   the means for the car lifting the weights is extendable/retractable for respectively engaging/not engaging the calibration weights when the car is moved above the uppermost end of its normal excursion.

7. Apparatus according to claim 5 wherein:
   the means for the car lifting the weights is a pivoted platform held in a position to engage and lift the calibration weights when the car moves slowly above the uppermost end of its normal excursion in the shaftway by a force release mechanism or shear pin, which platform will be caused by the force release mechanism or shear pin to swing to a position not engaging the calibration weights in the event of excessive force on the platform in order to preclude damage to the equipment during abnormal conditions.

* * * * *